United States Patent Office 3,116,438
Patented Dec. 31, 1963

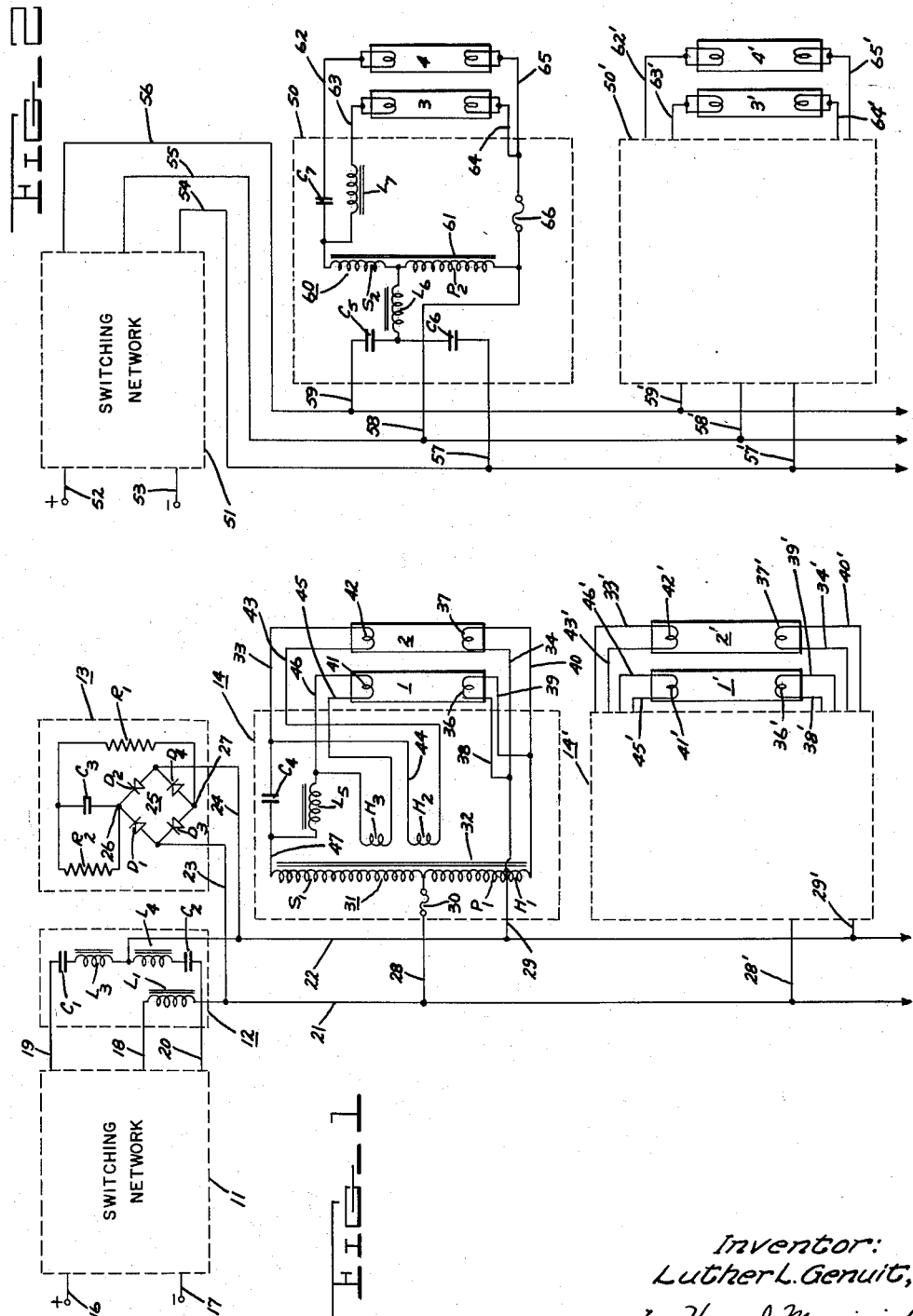

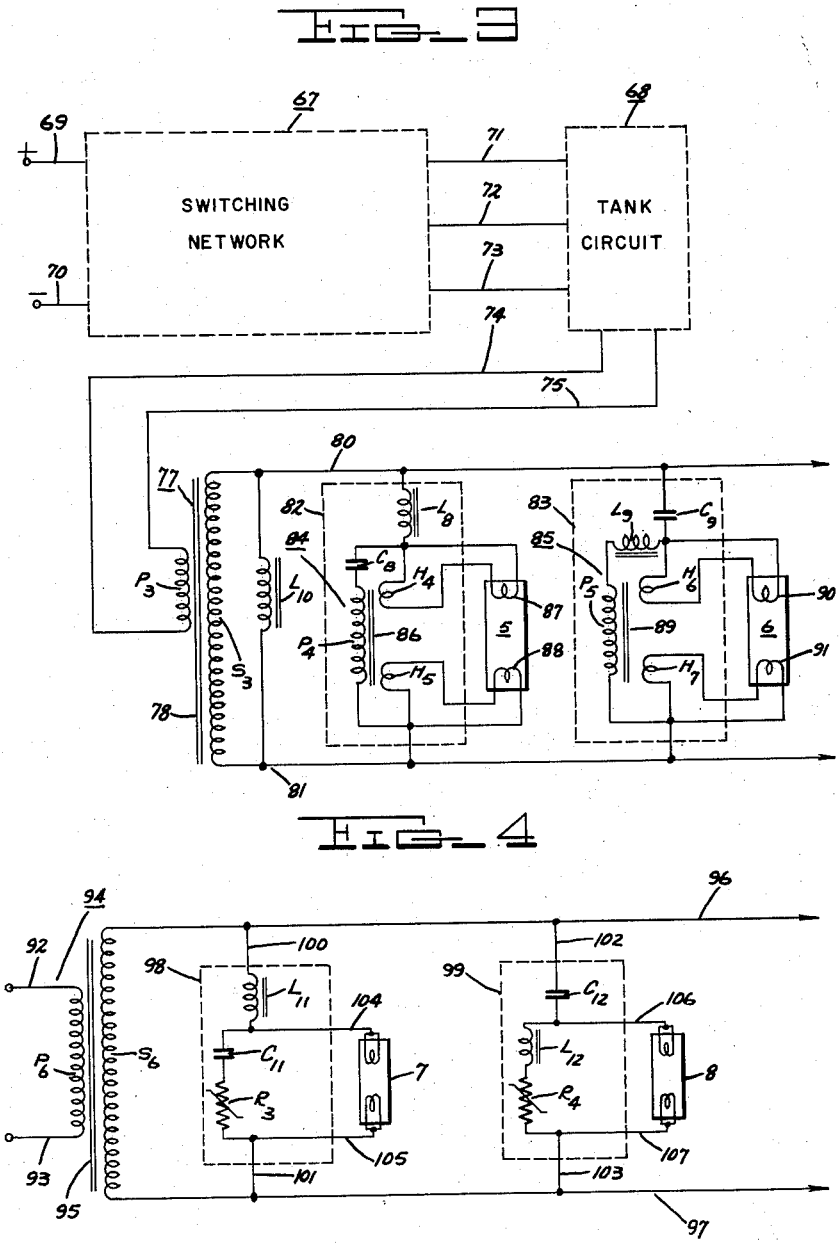

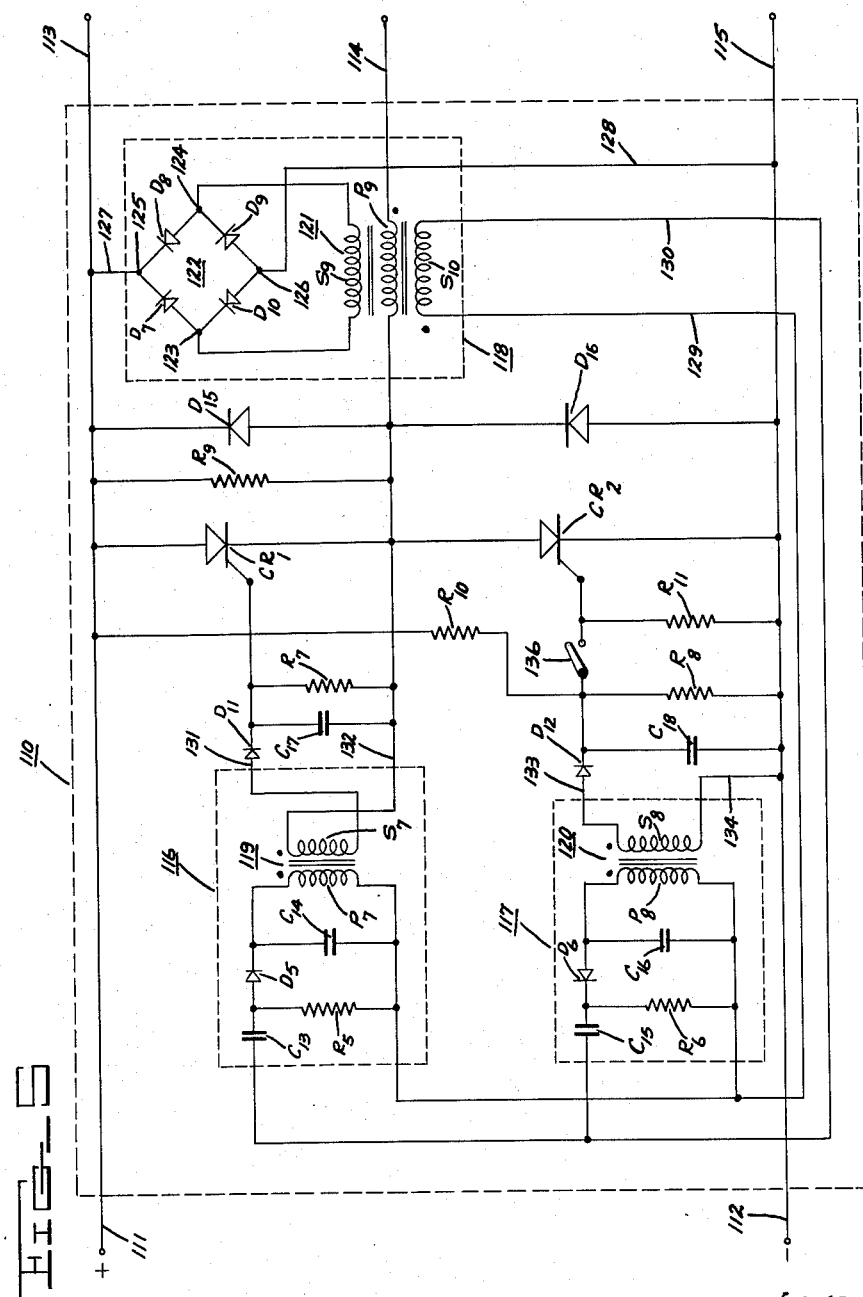

3,116,438
HIGH FREQUENCY LIGHTING SYSTEMS AND
BALLAST CIRCUITS THEREFOR
Luther L. Genuit, Scottsdale, Ariz., assignor to General
Electric Company, a corporation of New York
Filed June 1, 1961, Ser. No. 114,197
22 Claims. (Cl. 315—138)

This invention relates to high frequency lighting systems and ballast circuits therefor. More particularly, it relates to high frequency lighting systems and ballast circuits for use in conjunction with static inverters employed to convert a direct current supply into a high frequency alternating current.

Self-excited series inverters utilizing controlled rectifiers have been found to be particularly suitable for high frequency lighting applications since they can be readily adapted to convert a direct current supply into a high frequency alternating current. Parallel type of inverters have not been particularly adaptable to high frequency lighting applications since a short circuit in the load may cause the controlled rectifiers to simultaneously conduct and thereby cause the destruction of the controlled rectifiers. Although the series type of inverter may be operated for a limited period into a short circuit, it will not operate into an open circuit. This poses a problem when a fluorescent lamp load is operated in a system employing a series type of inverter since an open circuit condition necessarily exists during the first few cycles after an alternating voltage is applied to a fluorescent lamp before it is ignited.

The lighting systems and ballast circuits to which the present invention is applicable utilize series inverter circuits employing controlled semi-conductor rectifiers in conjunction with a switching network and a tank circuit. Such series inverter circuits utilize the resonant characteristics of the tank circuit to maintain their oscillations and also include one or more capacitors which are alternately charged and discharged as a direct current input is converted into high frequency alternating current. The switching network serves as a polarity reversing switch and connects the direct current potential to the tank circuit at alternately positive and negative polarity in order to maintain the oscillations in the tank circuit at its resonant frequency.

In general, fluorescent lamp systems employing such series inverters may be conveniently classified as distributed and nondistributed systems depending on the location of the components of the tank circuit. In a nondistributed system, a central series inverter includes the components of the tank circuit. In a distributed system only the switching network is at a central location and the tank circuit and ballast circuit components are located adjacent to the lighting fixtures. A distributed system employing a monocyclic network combined with the tank circuit components to produce a combined resonant and current limiting network is described and claimed in my copending application Serial No. 29,982, filed on May 18, 1960, now Patent No. 3,018,408, and assigned to the same assignee as the present invention.

There is a need for a lead and lag high frequency lighting system that can be readily operated in connection with a resonant type of inverter in a distributed and nondistributed type of system. In the event of lamp failures, it is desirable that any unbalance between lead and lag lamps be prevented. Since the failure of a lead or lag lamp results in an increase in the current as compared with the current normally supplied to the lamps, it is desirable that the effect of the increased current in the ballast circuit be minimized.

The general object of the invention is to provide an improved high frequency fluorescent lamp system for starting and operating a plurality of fluorescent lamps in a lead and lag arrangement.

A more specific object of the invention is to provide an improved ballast circuit for use in a high frequency lighting system employing a series resonant inverter circuit whereby the balance in the system between lead and lag lamps is not upset by lamp failures.

Another object of the invention is to provide an improved fluorescent lamp lighting system employing a series resonant inverter circuit whereby the inverter circuits can be operated during the open circuit condition of the fluorescent lamps in the system.

These and other objects and advantages are achieved in a high frequency lighting system employing a series resonant inverter to supply a high frequency alternating current to a plurality of gaseous discharge lamps wherein the lamps are operated in a balanced lead and lag arrangement. In one aspect of the invention a ballast circuit is associated with each pair of lamps and individual current fuses are provided in the ballast circuits, the fuses being responsive to a failure of a lamp associated with the ballast circuit and causing an open circuit in the ballast circuit when a lamp failure occurs thereby preventing an unbalance in the system.

In another aspect of the invention a high frequency lighting system and ballast circuits for use in conjunction therewith are provided wherein a plurality of lamps are operated in a lead and lag arrangement from a series resonant inverter. In order that the series resonant inverter can be operated under the open circuit condition which exists when the lamps are not ignited, a plurality of filament transformers are employed to provide a low resistance during starting and a high resistance during operation. In another modification of this aspect of the invention, a nonlinear resistor is connected across each of the lamps, the nonlinear resistor presenting a low resistance in the circuit under starting conditions and a higher resistance during operation thereby providing a sufficient starting load for the series resonant inverter. Further, I have found that by connecting a capacitive reactor in series circuit with the inductor in a lag lamp circuit or an inductive reactor in series circuit relationship with the capacitor in the lead lamp circuit to form an oscillatory circuit tuned to the operating frequency, a further increase in the starting load may be obtained under open circuit conditions.

The subject matter which I regard as my invention is set forth in the appended claims. The invention itself, however, together with further objects and advantages thereof may be understood by referring to the following description taken in connection with the accompanying drawings in which:

FIG. 1 is a schematic circuit diagram of a lighting system illustrating one form of the invention;

FIG. 2 is a schematic circuit diagram illustrating another embodiment of the invention;

FIG. 3 is a schematic circuit diagram of a high frequency lighting system in accordance with the invention wherein during open circuit condition of the lamps, the starting load for the series resonant inverter is provided by the several ballast circuits;

FIG. 4 is a schematic circuit diagram of a ballast circuit arrangement in accordance with the invention for operating instant start lamps in the high frequency system shown in FIG. 3; and FIG. 5 is a schematic circuit diagram of the switching network used in the embodiments of the invention illustrated in FIGS. 1, 2 and 3.

In FIG. 1, I have illustrated a high frequency lighting system which is energized from a resonatnt inverter comprised of a switching network 11, a central tank circuit 12, an inverter starting load circuit 13 and a plurality of lead-lag ballast circuits 14, 14'.

As shown in FIG. 1, the principal component circuits of the system are enclosed in the dashed rectangles. I have omitted the detailed internal circuit connections and components of the switching network since a switching network suitable for use in the various high frequency lighting systems of the invention is illustrated in FIG. 5 and will be hereinafter more fully described.

A pair of input terminal leads 16, 17 are provided for connection to a suitable direct current supply (not shown) such as a battery or rectified alternating current supply. If the input terminal leads 16, 17 of a switching network employing controlled rectifiers are to be connected across a rectified alternating current supply, the rectified output should be filtered for the purpose of protecting the controlled rectifiers used in the switching network against A.C. line voltage transients. The central tank circuit 12 is connected in circuit with the switching network 11 by means of a switching network lead and a pair of direct current leads 19, 20 which are provided for connecting the tank circuit 12 across the direct current supply. The tank circuit 12 includes the capacitors $C_1$ and $C_2$, the tank reactor $L_1$ and a pair of reactors $L_3$ and $L_4$. Preferably two capacitors $C_1$ and $C_2$ are employed in the tank circuit 12 since the number of pulses drawn from the direct current supply is doubled. Where only a single capacitor is used, the current pulse drawn from the direct current supply would be twice as large and would occur half as often for the same power output. Capacitors $C_1$, $C_2$ and the tank reactor $L_1$ determine the resonant frequency of the alternating current provided at inverter supply lines 21, 22. Reactors $L_3$, $L_4$ are provided to minimize the effect of current spikes occurring during the switching interval of the controlled rectifiers used in the switching network.

The inverter starting load circuit 13 serves the purpose of providing a load for the inverter during the starting period when the lamps in effect appear as an open circuit in the system. The inverter starting load circuit 13 is connected across the inverter supply lines 21, 22 by leads 23, 24 and includes a bridge rectifier 25 having diodes $D_1$, $D_2$, $D_3$, $D_4$, a resistor $R_1$ and capacitor $C_3$ connected across the output terminals 26, 27 of the bridge rectifier 25 and a resistor $R_2$ connected in shunt with the capacitor $C_3$. During the charging period of capacitor $C_3$, the resistor $R_1$ provides a transient load to enable the series inverter to start when lamps 1, 2, 1', 2' are not ignited. Resistor $R_2$ is provided to discharge capacitor $C_3$ when power to the inverter is cut off.

A plurality of ballast circuits may be connected across the inverter supply lines 21, 22, only two of which are shown. The number of ballast circuits and lamps to be connected in the system is limited by the ampere rating of the controlled rectifiers employed in the switching network 11. As shown in FIG. 1, it will be seen that ballast circuits 14, 14' are connected by input leads 28, 29, 28' 29' across the inverter supply lines 21, 22. In a similar manner, additional ballast circuits may be connected across the inverter supply lines. Since the frequency of the total lighting system is essentially determined by the tank circuit 12, the frequency will not be affected by the total number of ballast circuits connected in the system.

It will be noted that the lamps 1 and 2 are connected in parallel circuit relation. Lamp 1 is referred to as a lag lamp because it is connected in a series circuit with an inductive reactor $L_5$ and the reactance in this lamp circuit is predominantly inductive. Lamp 2 is connected in series circuit with capacitor $C_4$. A current fuse 30 is connected in circuit with input lead 28 in order to prevent an unbalance of the system in the event that the lag lamp 1 or the lead lamp 2 should fail to ignite. In the hereinafter described exemplification of the invention, the lead and lag lamp currents for the system were found to be approximately 1.3 amperes. However, because of their relative phase relationship, the sum of the lead and lag currents was about .7 ampere. Thus, if either lamp 1 or 2 fails, the primary and the secondary currents in the ballast circuit 14 increase to approximately two times the normal operating level. When this occurs, the current fuse 30 in the input lead 28 opens and takes ballast circuit 14 off the inverter supply lines 21, 22. Balance of the system is restored by maintaining an equal number of lead and lag lamps in the system. The current fuse 30 also protects ballast transformer 31 from overheating.

The ballast transformer 31 used in the illustrative embodiment of the invention is a low reactance transformer 31 comprised of a magnetic core 32 having a primary winding $P_1$ connected across the input terminal leads 28, 29, a secondary winding $S_1$ and filament heating windings $H_1$, $H_2$, $H_3$. A pair of output leads 34, 47 apply the output of the low reactance transformer 31 across the parallel-connected lamps 1 and 2. Filament winding $H_1$ which is an extension of the primary winding $P_1$ is connected in circuit with filaments 36, 37 of lamps 1 and 2 by output lead 34 and electrical leads 38, 39, 40. Filament windings $H_2$, $H_3$ are connected in circuit with filaments 41, 42 by leads 43, 44 and 45, 46, respectively. The filament windings $H_1$, $H_2$, $H_3$ provide a continuous supply of heating current to the lamp filaments 36, 37, 41, 42.

The ballast circuit 14' has essentially the same components and internal circuit connections as ballast circuit 14. For the purpose of simplification, only the external connections are shown for ballast circuit 14'. Input terminal leads 28' 29' connect ballast circuit 14' across the inverter supply lines 21, 22. Lamp filaments 41', 42' are connected in the ballast circuit by leads 45', 46' and 33', 43', respectively. Similarly, leads 38', 39', 34', 40' connect filaments 36', 37' in the ballast circuit.

A principal advantage of the ballast circuit is that it can be operated in conjunction with a resonant series inverter without causing an unbalance in the system whenever a lamp fails. It is possible with the ballast circuits of the invention to operate from a series resonant inverter a plurality of lamps in a lead and lag arrangement at a power factor of approximately 100 percent. Further, since the series inverter is not dependent upon the resonant characteristics of the individual ballast circuits for its operation, pairs of lamps can be cut in and out of the system without affecting the frequency.

In FIG. 2 I have illustrated a distributed lead-lag high frequency lighting system. The distributed high frequency lighting system shown in FIG. 2 essentially differs from the consolidated system shown in FIG. 1 in that the tank circuit of the resonant inverter is made up of a plurality of individual tuned oscillatory circuits associated with each of the ballast circuits 50, 50' connected in the system.

A switching network 51, such as is shown in FIG. 5, was employed in the system. A pair of input terminal leads 52, 53 are provided for connection with a suitable direct current supply. Switching network supply lines 54, 55, 56 connect switching network 51 with ballast circuits 50, 50'. Although only two ballast circuits 50, 50' are shown, it will be appreciated that additional ballast circuits and the tuned oscillatory circuits associated therewith may be similarly connected in circuit with the switching network supply lines 54, 55, 56.

Referring now more specifically to the tuned ballast circuit 50 shown enclosed in the dashed rectangle of FIG. 2, it will be seen that three input terminal leads 57, 58, 59 are provided for connecting the tuned ballast circuit 50 in circuit with switching network supply lines 54, 55, 56. The tuned portion of the ballast circuit 50 includes the serially connected capacitors $C_5$ and $C_6$ which are connected in circuit with inductor $L_6$. Capacitors $C_5$, $C_6$ and inductor $L_6$ comprise a tuned oscillatory circuit which is resonant at the operating frequency of the system.

The inductor $L_6$ is connected to one end of a primary winding $P_2$ of a low reactance transformer 60. Inductively coupled with the primary winding $P_2$ on a magnetic core 61 is a secondary winding $S_2$. The output of the transformer 60 is applied to a pair of instant start type of lamps 3 and 4 by circuit means which includes electrical leads 62, 63, 64, 65, a capacitor $C_7$ and an inductor $L_7$. A current fuse 66 is connected in electrical lead 65. The fuse 66 serves the purpose of opening the transformer circuit in the event that either the lag lamp 3 or lead lamp 4 fail in operation.

Since the components and internal connections of the ballast circuit 50′ are the same as those used in ballast circuit 50, ballast circuit 50′ is represented schematically by the dashed rectangle. Ballast circuit 50′ is connected to the switching network lines by input terminal leads 57′, 58′, 59′. Lamps 3′ and 4′ are connected with the ballast circuit 50′ by electrical leads 62′, 63′, 64′, 65′.

From the foregoing description it will be seen that the distributed lead-lag system shown in FIG. 2 possesses a high degree of flexibility. The central switching network does not necessarily have to be designed for a particular kilowatt output. It is lighter in weight and quieter than a comparable central inverter employing a consolidated tank circuit. Further, this system provides the advantage that a plurality of lamps can be started and operated in a lead-lag arrangement in conjunction with a series resonant inverter without unbalancing the system when a lamp or lamps fail.

In FIG. 3, I have illustrated another embodiment wherein filament transformers are utilized to provide a starting load for a resonant inverter operating lead and lag lamps. It was found that by connecting filament transformers directly across the load under open circuit conditions the filament transformers provide a sufficient load into which the series resonant inverter can operate before the lamps are ionized.

The high frequency lighting system shown in FIG. 3 is a non-distributed system and employs a central series inverter comprised of a switching network 67 and tank circuit 68. The tank circuit shown in FIG. 1 and identified by reference number 13 is suitable for use in the system illustrated in FIG. 3. The type of switching network shown in FIG. 5 may be used in this exemplification of the invention. Input terminal leads 69, 70 are provided to energize the switching network 67 from a suitable D.C. current source such as a battery or a rectified alternating current source. Switching network lines 71, 72, 73 connect the switching network 67 with tank circuit 68. Inverter supply lines 74, 75 apply the high frequency alternating current output of the series inverter across the primary $P_3$ of transformer 77. Transformer 77 is provided to step up the inverter output voltage and includes a magnetic core 78 having the primary winding $P_3$ inductively coupled with a secondary winding $S_3$. One or more pairs of ballast circuits 82, 83 may be connected across output supply lines 80, 81 of transformer 77. Although individual ballast circuits 82, 83 are employed for starting and operating lamps 5 and 6, it will be apparent that ballast circuits 82, 83 can be combined into a single circuit for starting and operating a lead and a lag lamp.

Continuing with the description of the system shown in FIG. 3, it will be noted that each lamp 5 and 6 is connected across filament transformer 84, 85, respectively. An inductor $L_8$ is connected in series circuit relationship with lamp 5 while a capacitor $C_9$ is connected with lamp 6 thereby providing a lead and lag lamp arrangement. Although only a single lamp is shown associated with each of the filament transformers 84, 85, it will be appreciated that a pair of serially connected lamps can also be used in conjunction with the filament transformers 84, 85, if desired.

Filament transformer 84 has a primary winding $P_4$ inductively coupled on a magnetic core 86 with a pair of the filament heating windings $H_4$, $H_5$ which provide a continuous supply of heating current to the filaments 87, 88 of the lag lamp 5. Similarly, filament windings $H_6$, $H_7$ of filament transformer 85 are inductively coupled with primary winding $P_5$ on a magnetic core 89 to supply filaments 90, 91 of lamp 6 with heating current. The individual filament transformers 84, 85 provide the necessary load required by the series resonant inverter circuit to operate during the open circuit condition of lamps 5, 6. Before lamps 5 and 6 are ignited, the filament voltage is abnormally high because the filament transformers 84, 85 are connected across lamps 5, 6. Also, the lamp filaments upon starting are cold, and their cold resistance is considerably lower than the resistance during the lamp operation. The combination of the high component voltage and low filament resistance produces an appreciable starting load for the inverter. After the lamps 5, 6 are ignited, the filament voltage is reduced to a normal operating level.

In the operation of the system shown in FIG. 3, it was found that more reliable operation of the system was realized by connecting a reactor $L_{10}$ across the secondary winding $S_3$ of transformer 77. The reactor $L_{10}$ introduces an additional lagging load and causes a slight unbalance between leading and lagging components of the system. It will be apparent that the reactor $L_{10}$ can be replaced by employing an excess of lead or lag lamps in the system.

As shown in FIG. 3, a capacitive reactor $C_8$ may be connected in series with the primary winding $P_4$ of filament transformer 84 and an inductor $L_9$ may be connected in series circuit with the primary winding $P_5$ of the filament transformer 85. In accordance with this modification of the invention, sufficient inductive and capacitive reactance is introduced to provide an oscillatory circuit tuned at the operating frequency of the system in order to supply a transient voltage that will cause an increase during starting in the filament voltage over the normal operating level.

In FIG. 4, I have illustrated a modification of the invention wherein instant start lamps 7, 8 are operated in the system shown in FIG. 3. Electrical leads 92, 93 are provided for connection in circuit with the inverter supply lines of the system. The inverter output is thereby applied across primary winding $P_6$ of transformer 94. A secondary winding $S_6$ is inductively coupled with the primary winding $P_6$ on magnetic core 95. A pair of output leads 96, 97 apply the output of transformer 94 across ballast circuits 98, 99.

An inductor $L_{11}$ is connected in series circuit relationship with lamp 7 to cause a lagging current to flow to lamp 7 during operation. A capacitor $C_{12}$ is connected in series circuit relationship with lamp 8 to cause a leading current to flow thereto. It will be understood that a plurality of pairs of lead and lag lamps are preferably connected across the output leads 96, 97. A pair of input leads 100 and 101 connect ballast circuit 98 across transformer output leads 96, 97. In a similar manner ballast circuit 99 is connected across output leads 96, 97 by means of input leads 102, 103. It will be seen that by connecting leads 100 and 102 to a common lead and by connecting leads 101 and 103 to another common lead, the two ballast circuits 98, 99 can be combined into a single circuit for starting and operating a pair of lamps. It will be noted that only a pair of electrical leads 104 and 105 are brought out for external connection across lamp 7 since the filaments of an instant start lamp are short circuited and do not require filament heating current. Likewise, in ballast circuit 99, the two leads 106 and 107 are brought out for external connection to lamp 8, which is a lamp of the instant start type.

According to one form of the invention, a nonlinear resistor $R_3$, is connected across the lag lamp 7 and a nonlinear resistor $R_4$ is connected across the lead lamp 8. Preferably the nonlinear resistors $R_3$, $R_4$ are made of thyrite or other material having a resistance-temperature coefficient such that the nonlinear resistor presents a low resistance during starting and a higher resistance during operation. This characteristic combined with the high starting voltage will provide the series inverter with a sufficient load during open circuit condition of lamps 7, 8. When the lamps 7, 8 are ignited, the resistors $R_3$, $R_4$ are substantially ineffective in the circuit.

As shown in FIG. 4, a capacitor $C_{11}$ may be connected in series circuit with the inductor $L_{11}$ to provide the capacitive reactance to form an oscillatory circuit tuned at the operating frequency of the system so that during starting conditions an increased voltage is applied across the nonlinear resistor $R_3$. Similarly, an inductor $L_{12}$ may be connected in series circuit with capacitor $C_{12}$ so that an oscillatory voltage is developed under open circuit conditions.

In FIG. 5 I have illustrated a switching network generally identified by reference numeral 110, which is particularly adaptable for use in connection with the high frequency lighting systems and ballast circuits of the invention. The switching network 110 serves as a polarity reversing switch that connects the direct current potential applied at the input terminal leads 111, 112 in an alternately positive and negative polarity at the switching network supply leads 113, 114, 115. Where a tank circuit, such as is shown in FIG. 1, is used in conjunction with switching network 110, it will be appreciated that the combined circuit functions as a series resonant inverter. This type of series resonant inverter is described and claimed in my copending application Serial No. 6,018, filed February 1, 1960, assigned to the same assignee as the present application.

The switching network 110 includes two controlled rectifiers $CR_1$, $CR_2$, which may be any suitable type of controlled rectifier having sufficient current carrying capacity. Preferably, silicon controlled rectifiers may be employed. The direct current input terminals 111, 112 are provided for connection to a direct current supply source (not shown) which may be a rectified commercial alternating current source.

The controlled rectifiers $CR_1$, $CR_2$ used in the exemplification of the invention were PNPN unijunction semiconductors, each having an anode represented by the triangular symbol, a cathode represented by the line drawn through the apex of the triangle and a gate electrode represented by the diagonal line. The controlled rectifiers $CR_1$, $CR_2$ are switched to a high conduction state at an anode-to-cathode voltage less than the breakover voltage by supplying a low level gate-to-cathode current. Thus, the controlled rectifiers $CR_1$, $CR_2$ may be used to control a substantially large current flow by a low power signal supplied to the gate electrodes.

Due to the inherent characteristics of the silicon controlled rectifiers and their being connected serially across the direct current supply, switching does not occur simultaneously with the reversal of the current. It will be seen that when $CR_1$ is turned on, its forward voltage drop is nearly zero and the controlled rectifier $CR_2$ must support substantially the full direct current voltage in the forward direction. If the controlled rectifier $CR_2$ is turned on immediately when the current through controlled rectifier $CR_1$ goes to zero, controlled rectifier $CR_1$ will immediately return to a conducting state. If both controlled rectifiers $CR_1$, $CR_2$ are turned on at the same time, they may be destroyed by excessive current if the circuit is not adequately protected by fuses or circuit breakers. For this reason, it is necessary that a commutation or clean up period be provided in the switching network 110.

A pair of symmetrical firing circuits 116, 117 identified by the rectangles formed by the dashed lines provide the required commutation period and alternately fire the controlled rectifiers $CR_1$, $CR_2$ at each half cycle. Each of the firing circuits 116, 117 is shock-excited at each alternate half cycle by the square wave output of a sensing circuit 118 which is also generally identified by a dashed rectangle.

Firing circuit 116 includes capacitors $C_{13}$, a diode $D_5$, a resistor $R_5$, a capacitor $C_{14}$ connected across a primary winding $P_7$ of transformer 119. The gate electrode of controlled rectifier $CR_1$ is coupled with a firing circuit 116 by secondary winding $S_7$ of transformer 119. Diode $D_5$ alternately blocks and passes the current output of the sensing circuit 118 at the appropriate half cycle. Primary winding $P_7$ and secondary winding $S_7$ are connected so that when current flows out of the upper end of the primary winding $P_7$, an induced current flows out of the lower end of the secondary winding $S_7$. The capacitor $C_{14}$ and transformer 119 comprise an oscillatory circuit that provides the commutation period or delay between the instant the firing circuit is shock-excited and a pulse is provided to the gate of controlled rectifier $CR_1$.

It will be seen that firing circuit 117 has the same general configuration as firing circuit 116 except that diode $D_6$ is connected in reverse position as compared with diode $D_5$ of firing circuit 117. By being connected in this manner, diode $D_6$ will permit the firing circuit 117 to be shock-excited in the alternate half cycle during which the other diode $D_5$ is blocking current flow to firing circuit 116. Firing circuit 117 includes capacitors $C_{15}$, $C_{16}$, resistor $R_6$ and transformer 120 which has a primary winding $P_8$ and a secondary winding $S_8$. The primary winding $P_8$ and secondary winding $S_8$ are so arranged that when current flows out of the lower end of primary winding $P_8$, an induced current flows out of the upper end of the secondary winding $S_8$.

In order that maximum power be supplied by the switching network 110, switching should take place at the instant of current reversal. To sense the current reversal, the current sensing network 118 is provided. It includes a transformer 121 having a primary winding $P_9$ and secondary windings $S_9$, $S_{10}$ and a bridge rectifier 122 having diodes $D_7$, $D_8$, $D_9$ and $D_{10}$. The input terminals 123, 124 of the bridge rectifier 122 are connected across secondary winding $S_9$ and the output terminals 125, 126 are connected across the direct current input terminal leads 111, 112. The primary winding $P_9$ of transformer 121 carries the main network current during its operation. Bridge rectifier 122 causes the voltage across transformer 121 to be substantially a square wave of a fixed magnitude independent of the current magnitude but always in phase with the current at the switching supply line 114. This square wave voltage is supplied to the input leads 129, 130 connected in circuit with secondary winding $S_{10}$ and the firing circuits 116, 117.

It will be noted that each of the firing circuits 116, 117 are provided with a pair of output leads 131, 132 and 133, 134 which are provided so that the output of the firing circuits 116, 117 are applied across the gate and cathode of controlled rectifiers $CR_1$, $CR_2$, respectively. The capacitor $C_{17}$ and resistor $R_7$ serve the purpose of reducing the gate-to-cathode impedance of the controlled rectifier $CR_1$ in order to minimize the effects of transient pulses that might cause misfiring. The capacitor $C_{18}$ and resistor $R_8$ serve a similar function in the gate and cathode circuit associated with controlled rectifier $CR_2$. Capacitors $C_{13}$ and $C_{15}$ are employed in the firing circuits so that only a spike of current flows into the firing circuits 116, 117 to prevent an excessive amount of energy from being stored in transformer 119, 120. Resistors $R_5$ and $R_6$ provide discharge paths for capacitors $C_{13}$ and $C_{15}$, respectively.

A pair of power diodes $D_{15}$, $D_{16}$ are connected in reverse parallel connection with controlled rectifiers $CR_1$, $CR_2$. The basic circuit configuration employing power diodes in reverse parallel connection is claimed and described in my copending application Serial Number 5,847, filed February 1, 1960, and assigned to the same assignee as the present application. This feature is not a part of this invention.

During the commutation period of the controlled rectifiers $CR_1$ and $CR_2$, the power diodes $D_{15}$ and $D_{16}$ carry the switching network current. This results in an elimination of the gaps that would occur in the switching network output current if some provision were not made for current flow to the network supply line 114 during the commutation period of the controlled rectifiers $CR_1$, $CR_2$.

Since the switching frequency is a function of the resonant circuit associated with the switching network 110, a starting circuit is necessary to initiate the oscillations. The starting circuit is comprised of resistors $R_8$, $R_9$, $R_{10}$, capacitor $C_{18}$ and switch 136. The ohmic value of the resistors $R_8$ and $R_{10}$ determine the voltage to which capacitor $C_{18}$ will charge when switch 136 is in the open position. During the starting condition of the circuit, the resistor $R_9$ will in effect serve to short out controlled rectifier $CR_1$ and cause the direct current voltage input to be applied across controlled rectifier $CR_2$. Thus, controlled rectifier $CR_2$ is the controlled rectifier that is initially triggered to start the operation of the switching network 110. When switch 136 is closed, capacitor $C_{18}$ discharges and supplies a positive current to the gate of controlled rectifier $CR_2$ and thereby turns it on. Once the operation of the switching network has been initiated, the switching of the controlled rectifiers $CR_1$ and $CR_2$ is accomplished by means of the current sensing circuit 118 shock exciting the firing circuits 116, 117.

In operation firing circuits 116, 117 provide the commutation period or delay from the instant the current reverses at the switching network line 114. Let us assume that the polarity of the voltage induced across the secondary winding $S_{10}$ of transformer 121 is such that $D_5$ conducts current and the oscillatory circuit comprised of the capacitor $C_{14}$ and transformer 119 is excited. The polarity of the voltage across the transformer 119 during the first half cycle of the oscillation in the oscillatory circuit is such that the diode $D_{11}$ blocks any current to the gate of the controlled rectifier $CR_1$. After the first half cycle of the oscillation, the polarity reverses and a pulse of current flows to the gate of controlled rectifier $CR_1$, turning it on. Thus, the length of the commutation period is determined by the resonant frequency of the oscillatory circuit. Firing circuit 117 operates in a similar manner to provide a predetermined timed delay when it is shock-excited by the output of the sensing circuit 118.

Having reference to the switching network circuit shown in FIG. 5 and the high frequency system shown in FIG. 1, the operation of the high frequency lighting system shown in FIG. 1 will now be more fully described. The operation of the system is initiated by connecting the direct current input terminals 16, 17 across a direct current voltage source. When a direct current potential is applied across the input terminals 16, 17 it will be seen that the potential also appears across the switching network supply lines 19, 20 and across the serially connected capacitors $C_1$, $C_2$ thereby placing an initial charge on the capacitors $C_1$ and $C_2$. When controlled rectifier $CR_2$ is initially fired, capacitors $C_1$ and $C_2$ discharge through the inductors $L_3$, $L_4$, and to inverter output lead 22. Thus, this discharge current is supplied to the starting load circuit 13 and ballast circuits 14, 14'. The instantaneous current enters input lead 24 of the starting load circuit 13 and leads 29, 29' of ballast circuits 14, 14'. A return path for the current is provided through terminal lead 23 of the starting load circuit 13, terminal leads 28, 28' of ballast circuits 14, 14' and to the inverter supply line 21, inductor $L_1$, switching network supply line 18, controlled rectifier $CR_2$, input lead 17 and the negative side of the power supply. This main current flow constitutes a portion of the first half cycle of the alternating current.

During the initial starting period, the only load provided by the ballast circuits is the filament winding load of the ballast transformers. Starting load circuit 13 serves as a means for providing a sufficient load for the series resonant inverter which is comprised of the switching network 11 and tank circuit 12. Initially, the current flow in the starting load circuit 13 follows a path starting from the inverter supply line 22 to the input lead 24, diode $D_2$, the capacitor $C_3$, the resistor $R_1$, diode $D_3$, input lead 23 and to the inverter supply line 21. The charging of the capacitor $C_3$, provides an initial starting load for the circuit before the lamps 1, 2 and 1', 2' are ignited. The resistor $R_2$ discharges the capacitor $C_3$ when the inverter is shut down in order that the circuit may be reset for the next starting operation.

Having reference to the switching network shown in FIG. 5 and the system shown in FIG. 1, when controlled rectifier $CR_1$ is fired, the path of main current flow in the system shown in FIG. 1 may be traced from the positive input terminal lead 16, switching network supply lead 18, inductor $L_1$, the inverter supply line 21 and the input terminal leads 28, 28' of the ballast circuits 14, 14'. The return path of the current flow in the system may be traced from input terminal leads 29, 29' to the inverter supply line 22, the inductor $L_4$, the capacitor $C_2$ and to the negative input lead 17 of the switching network 11. It will be seen that during this half of the cycle, the capacitors $C_1$ and $C_2$ are charged and during the other half of the alternating current cycle the capacitors $C_1$ and $C_2$ are discharged. The frequency of the alternating current supplied to the ballast circuits 14, 14' depends essentially upon the resonant characteristics of the tank circuit 12 and the ballast circuits 14, 14'.

During operation, a high frequency alternating voltage is applied across the primary winding $P_1$ of the transformer 31. When this voltage is first applied and before the lamps are ignited, the lamp filaments are supplied with heating current by the filament heating windings $H_1$, $H_2$, $H_3$. When lamps 1 and 2 are ignited, the reactive impedance of the capacitor $C_4$ causes a leading current to be supplied to lamp 2 during operation. Since the reactive impedance in the circuit supplying lamp 1 is predominately inductive, the current in lamp 1 during operation is lagging. It will be understood that the open circuit voltage developed by transformer 31 is sufficient to start lamps 1 and 2. After lamps 1, 2 are ignited, the reactive voltage drops across capacitor $C_4$ and inductor $L_5$ leaving a resultant voltage across the lamps 1 and 2 which is substantially less than the open circuit voltage.

In the exemplification of the invention to be hereinafter more fully described, with only one lamp operating in the ballast circuit 14, it was found that the current in the secondary winding $S_1$ was approximately 1.3 amperes where the lamps were eight foot power groove fluorescent lamps. With both lamps operating, the current in the secondary winding was measured at .7 ampere.

In accordance with the invention a circuit interrupting means such as the current fuse 30 is connected in circuit with transformer 31 and is responsive to the current increase in the ballast circuit caused by a lamp failure or open circuit condition across one set of lamp terminals. It will be appreciated that the fuse 30 is activated at a lower current level than a line fuse or an individual current fuse used to protect a ballast against certain electrical faults. The fuse 30, as employed in ballast circuits of the invention, does not eliminate the need for conventional fuses that provide circuit protection. In ballast circuit 31 the increased current in the secondary winding $S_1$ is reflected in an increase in the current in the primary winding $P_1$. Fuse 30 senses the increased current when one of the lamps 1, 2 fails and opens the circuit in input terminal lead 28.

It will be apparent from the foregoing description that the invention makes it possible to operate a plurality of lamps in a lead-lag arrangement from a series resonant inverter. When one of the lamps in the lead and lag lamp arrangement of the invention fails, the associated lamp and the failed lamp is taken off the line by the fuse. The invention provides a novel and improved circuit whereby the switching network is protected positively against excessive current flow resulting from lamp failures in the system.

The ballast circuit 14 shown in FIG. 1 was constructed to start and operate a pair of 8 foot power groove lamps. The following circuit components identified below are cited by way of example to illustrate a specific reduction to practice of the invention, the lamps being operated from a series resonant inverter as shown in FIG. 1, supplying an alternating current at 3,000 cycles per second, at 100 volts.

Transformer 31:

| | |
|---|---|
| Primary winding $P_1$ | 2 coils of 99 turns each of .032 inch wire connected in parallel. |
| Secondary winding $S_1$ | 424 turns of .0201 inch wire. |
| Cathode Heating windings $H_1$, $H_2$, $H_3$ | 4 turns of .0226 inch wire. |
| Magnetic core 32 | Allen Bradley 207A ferrite cup core. |
| Capacitor $C_4$ | .143 microfarads, 450 volts, 3,000 cycles. |
| Inductor $L_5$ | Allen Bradley 207A ferrite cup core. |
| Fuse 30 | Bussmann BBS5 fuse. |

Referring now to FIG. 2, the operation of the system shown therein will now be more fully described. The distributed lead-lag system shown therein employs a central switching network 51 such as is shown in FIG. 5. In the high frequency lighting system shown in FIG. 2, each ballast circuit 50, 50' carries a portion of the reactive elements of the inverter tank circuit and consequently no central tank circuit is required in this system.

The switching network 51 functions in the same manner as the switching network hereinbefore described in connection with the high frequency system shown in FIG. 1. It serves as a polarity reversing switch. Considering an arbitrary half cycle of the high frequency alternating current supply when capacitors $C_5$, $C_6$ are discharged through inductor $L_6$, the path of the current flow is through the upper end of the primary winding $P_2$, input terminal lead 58, switching network line 55 and to the negative input lead 53. In the next half cycle, the direction of the flow is reversed and the current follows a path, starting with the positive input terminal lead 52 of the switching network 51, through the switching network supply line 55, input terminal lead 58, primary winding $P_2$, inductor $L_6$, capacitor $C_6$, input terminal lead 57, switching network supply line 54 and to the negative input terminal lead 53. It will be noted that during this half cycle the capacitors $C_5$, $C_6$ are charged. The frequency of the alternating current supplied to the primary winding $P_2$ of the transformer 60 is determined by the reactive elements, capacitors $C_5$, $C_6$, the inductor $L_6$ and the corresponding reactive elements of the other ballast circuit in the system.

Secondary winding $S_2$ of transformer 60 is provided with sufficient number of turns so that the output of transformer 60 is sufficient to ignite lamps 3 and 4. After lamps 3 and 4 are ignited, due to the reactive impedances of $C_7$ and $L_7$, operating lamp voltages are reduced as compared with the lamp voltage during the open circuit condition. In the event that either lamp 3 or 4 fails, the increased current flow in the transformer 60 will activate the fuse 66 and cause an open circuit in the output lead 65. Thus, it will be noted that in the event of a lamp failure, both lamps 3 and 4 are taken off the system. Fuse 66 may, if desired, be connected in lead 58. When activated in this location the entire tuned circuit of ballast 50 is removed from the system. Since all ballast circuits are identical and are connected in parallel, the resonant frequency of the system is the same if one or several ballasts are connected. Consequently, the frequency of the system is not affected as lamp failures occur.

From the foregoing description, it will be appreciated that the distributed lead-lag system shown in FIG. 2 possesses the advantage that the same switching network may be employed to operate any lamp load which does not exceed the rating of the controlled rectifiers. In lighting systems where a central tank circuit is used in conjunction with a switching network, the central switching network is designed for a particular load rating and consequently lacks flexibility. In the system shown in FIG. 2, the mode of operation of any pair of lamps is completely independent of the number of other such lamps operating in the system.

The ballast circuits 82, 83, 100, 102 illustrated in FIGS. 3 and 4 are operated from a series resonant inverter having a central tank circuit. When the switching network 67, shown in FIG. 3 is energized, an alternating current of predetermined frequency is supplied to the primary winding $P_3$ of the output transformer 77. The output transformer 77 steps up the voltage to the level required to start the fluorescent lamps 5 and 6. Since the filament transformers 84 and 85 are connected across the lamps 5 and 6, the filament voltage is abnormally high before the lamps 5, 6 are ignited. Further, during the starting condition, the filament of lamps 5, 6 are generally cold and consequently their cold resistance is lower than it would normally be during lamp operation. The high filament voltage and low filament resistance during the starting condition provide a sufficient starting load for the series resonant inverter so that it can operate during the open circuit condition of the lamps. When the lamps 5, 6 are ignited, the resultant voltage across the lamps 5 and 6 is reduced to the operating level of the lamps 5, 6 because of the reactive voltage drops across inductor $L_8$ and capacitor $C_9$.

The ballasting action required because of the negative resistance characteristic of the lamps 5, 6 is provided by the inductor $L_8$ for the lag lamp 5 and by the capacitor $C_9$ for the lead lamp 6. It was found that more reliable starting and operation of the lamps was obtained in the system shown in FIG. 3 if inductor $L_{10}$ was connected across the secondary winding $S_3$ of transformer 77 so that an additional lagging current load was provided in the system.

The nonlinear resistors $R_3$ and $R_4$ of the ballast circuits 100 and 102 of the circuit shown in FIG. 4, function in the same manner as the filament transformers of the system illustrated in FIG. 3. The nonlinear resistors $R_3$, $R_4$ have a high resistance-temperature coefficient. During the starting condition, the resistors $R_3$, $R_4$ provide a low resistance and thereby provide a sufficient starting load for the series resonant inverter. A principal advantage of the high frequency lighting system shown in FIGS. 3 and 4 is that the series resonant inverter can be operated reliably during the open circuit condition of the lamps in the systems without need for a separate starting load circuit.

It will be understood that the various systems and ballast circuits described herein are intended as illustrative embodiments of the invention and that the invention is not limited to such specific embodiments thereof. Further, it will be apparent that other modifications of the invention described herein may be made. It is to be understood, therefore, that I intend by the appended claims to cover all such modifications that fall within the true spirit and scope of the invention.

What I claim as new and desire to secure by Letters Patent of the United States is:

1. A system for operating a plurality of gaseous discharge lamps with high frequency alternating current comprising: a direct current source, a series resonant inverter for converting the direct current from said source into a high frequency alternating current; a plurality of gaseous discharge lamps; a plurality of ballast circuits, each of said ballast circuits being connected in circuit with a pair of said plurality of gaseous discharge lamps and including a pair of input leads connected in circuit with said inverter, a transformer having a primary winding and a secondary winding inductively coupled therewith on a magnetic core, and circuit means for applying the output of said transformer across said lamp including an inductive element and a capacitive element; said inductive element being connected in series circuit relation with one of said pair of lamps to cause a lagging current to flow thereto and said capacitor being connected in series circuit relation with the other of said lamps to cause a leading current to flow thereto; and a circuit interrupting means connected in circuit in each of said ballast circuits, said circuit interrupting means being responsive to a lamp failure and causing both lamps to be turned off when one of said lamps fails, thereby maintaining in operation an equal number of lead and lag lamps in the system.

2. A system for starting and operating a plurality of gaseous discharge lamps comprising: a direct current source; a switching network connected in circuit with said direct current source; a tuned circuit means connected in circuit with said switching network to cause the polarity of said direct current to reverse at a predetermined frequency thereby converting said direct current to a high frequency alternating current; a plurality of gaseous discharge lamps; a plurality of ballast circuits, each of said ballast circuits being connected in circuit with a pair of said lamps and including a transformer having a magnetic core, a primary winding and a secondary winding inductively coupled therewith and circuit means connecting said pair of lamps in said ballast circuit and including an inductive element connected in circuit with one of said pair of lamps and a capacitive element connected in circuit with the other of said lamps in order to operate said lamps as lead and lag lamps; and a current fuse connected in circuit with said transformer to cause said pair of lamps to be deenergized when one of said lamps fails in order to operate an equal number of lead and lag lamps in the system and circuit means connecting said ballast circuits in electrical circuit with said tuned circuit means and said switching network so that a high frequency alternating current is supplied to said ballast circuits.

3. A system for starting and operating a plurality of gaseous discharge lamps with a high frequency alternating current comprising: a direct current source; a switching network connected in circuit with said direct current source; tuned circuit means connected in circuit with said switching network to cause said switching network to reverse the polarity of said direct current at a predetermined frequency to provide a high frequency alternating current; a plurality of gaseous discharge lamps; a plurality of ballast circuits; circuit means connecting said lamps in circuit with said ballast circuits and including a plurality of inductive elements and capacitive elements in order to operate said lamps as lead and lag lamps; a starting load circuit means for providing a starting load for said tuned circuit means and switching network to permit operation thereof during the open circuit condition of said lamps; and circuit means connecting said ballast circuits and said starting load circuit means in circuit with said switching network and said tuned circuit means.

4. The system set forth in claim 3 wherein each of said ballast circuits includes a transformer having a primary winding with a pair of output terminal leads for connection in circuit with the switching network and a secondary winding inductively coupled with the primary, said secondary being connected in circuit with at least a pair of gaseous discharge lamps connected in parallel circuit branches, one of the circuit branches including one of said capacitive elements and the other circuit branch including one of said inductive elements.

5. The system set forth in claim 3 wherein each of said ballast circuits includes a transformer having a primary winding and a secondary winding, said tuned circuit means being comprised of an oscillatory circuit associated with each of said ballast circuits and including at least a capacitor and an inductor tuned to cause said switching network to oscillate at said predetermined frequency, said oscillatory circuit being connected in circuit with the primary winding of said transformer, and said circuit means connectng said ballast circuit including a current fuse connected in circuit with each of said transformers to cause the gaseous discharge lamps operated by a ballast circuit to be deenergized when one of the lamps operated by said ballast circuit fails thereby maintaining a balanced load of lead and lag lamps.

6. A system for operating a plurality of fluorescent lamps with a high frequency alternating cuurent comprising: a direct current source; a series resonant inverter connected in circuit with said direct current source and converting said direct current into a high frequency alternating current; a plurality of fluorescent lamps; a plurality of ballast circuits, each of said ballast circuits being connected with a pair of said plurality of lamps and including a transformer having a magnetic core, a primary winding and a secondary winding inductively coupled therewith and circuit means including an inductive element and a capacitive element and connecting said lamps in circuit so that the output of said transformer is applied thereacross to operate said pair of lamps as lead and lag lamps; a current interrupting means connected in circuit with said transformer, said current interrupting means being responsive to a failure of said lamps and causing said pair of lamps to be deenergized when one lamp fails; a starting load circuit connected in circuit with said series resonant inverter to provide a starting load for said inverter during the open circuit condition of said lamps, said starting load circuit including a current rectifying means having input terminals and output terminals, said input terminals being connected in circuit with said inverter and said output terminals being connected in circuit with a serially connected capacitor and resistor, said capacitor being initially charged by said rectifying means to provide a starting load for the operation of said inverter; and circuit means connecting said plurality of ballast circuits in electrical circuit with said series resonant inverter so that the high frequency alternating current output thereof is supplied to said ballast circuits.

7. A ballast circuit for starting and operating a pair of gaseous discharge lamps from a high frequency alternating current supplied by a series resonant inverter, said ballast circuit comprising an inductive element, a capacitive element, a transformer having a pair of input terminal leads for connection in circuit with the inverter, circuit means including electrical leads for connecting said transformer in circuit with said lamps to supply said high frequency alternating current thereto and for connecting said inductive element is series circuit relation with one of said lamps and said capacitive element in series circuit relation with the other of said lamps, said inductive element causing a lagging current to flow to one of said lamps and said capacitive element causing a leading current to flow to the other of said lamps, and a circuit interrupting means connected in circuit with one of said input terminal leads, said circuit interrupting means being responsive to a failure of one of said lamps to cause said pair of lamps to be deenergized to prevent an unbalance in the current in the circuit when one of the lamps fails during operation.

8. A ballast circuit for starting and operating a pair of fluorescent lamps with high frequency alternating current supplied by a series resonant inverter, said ballast circuit comprising a low reactance transformer having a magnetic core, a primary winding and a secondary winding inductively coupled therewith on said core, a pair of input terminal leads connected across said primary winding for connection in circuit with said series resonant inverter, circuit means for connecting said pair of lamps in parallel circuit relation across said transformer and including an inductive element to cause a lagging current to flow to one of said pair of lamps and a capacitive element to cause a leading current to flow to the other of said lamps during operating and a current fuse connected in circuit with said primary winding to disconnect said transformer from said high frequency alternating current supply when one of said lamps fails.

9. A ballast circuit for starting and operating a pair of gaseous discharge lamps with high frequency alternating current in conjunction with an external switching network energized from a direct current power source, said ballast circuit comprising a transformer having a magnetic core, a primary winding and a secondary winding inductively coupled therewith on said core, an oscillatory circuit including at least a capacitor and an inductor tuned to cause the switching network to oscillate at a predetermined frequency, circuit means for applying the output of said transformer to said lamps and including a capacitive element to cause a leading current to flow through one of said lamps and including an inductive element to cause a lagging current to flow to the other of said lamps, a current fuse connected in circuit with said transformer to cause both of said lamps to be deenergized when one of said lamps fails, and circuit means connecting said oscillatory circuit in electrical circuit with said transformer and including electrical leads for connection with said switching network so that a high frequency alternating current is applied across said primary winding during operation.

10. The ballast circuit set forth in claim 9 wherein said fuse is connected in series circuit relation with said secondary winding of said transformer.

11. A system for operating a plurality of gaseous discharge lamps with high frequency alternating current comprising: a direct current source; a series resonant inverter connected in circuit therewith to convert said direct current into a high frequency alternating current; an output transformer having a magnetic core, a primary winding and a secondary winding inductively coupled therewith on said core, circuit means connecting said primary winding in circuit with said series resonant inverter so that the high frequency alternating current output of said inverter is applied across said primary winding of said output transformer; a first plurality of filament transformers, each of said first plurality of filament transformers being connected in series circuit relation with an inductive element; a second plurality of filament transformers, each of said filament transformers being connected in series circuit relation with a capacitive element; a first circuit means connecting said filament transformers across at least one gaseous discharge lamp; and a second circuit means for applying at least the voltage across said secondary winding of said output transformer across each of said serially connected filament transformers and capacitive elements and across each of said serially connected filament transformers and inductive elements, said filament transformers providing a sufficient starting load for the operation of said series resonant inverter during the open circuit condition of said lamps.

12. The system as set forth in claim 11 wherein a capacitive element is connected in series circuit relation with each of said inductive elements and the filament transformers to form an oscillatory circuit tuned at the operating frequency of said series resonant inverter, and an inductive element is connected in series circuit relation with each of said serially connected capacitors and filament transformers to form an oscillatory circuit tuned to the operating frequency of said series resonant inverter in order to provide an increased filament voltage during the starting condition of said lamps.

13. A system for operating a plurality of gaseous discharge lamps with high frequency alternating current comprising a direct current source, a series resonant inverter connected in circuit with said direct current source to convert said direct current source into a high frequency alternating current, an output transformer having a magnetic core, a primary winding and a secondary winding inductively coupled therewith on said core, circuit means connecting said primary winding in circuit with said inverter so that the alternating current output of said inverter is applied thereacross, a pair of output leads connected in circuit with said output transformer, a first plurality of ballast circuits connected in circuit across said output leads, each of said first plurality of ballast circuits including a serially connected inductive element and a nonlinear resistor, at least one of said plurality of lamps being connected in circuit across said nonlinear resistor, a second plurality of ballast circuits connected in circuit across said output leads, each of said second plurality of ballast circuits including a serially connected capacitive element and a nonlinear resistor, at least one of said plurality of lamps being connected across each of said nonlinear resistors, said nonlinear resistors providing a sufficient starting load for the operation of said series resonant inverter during the open circuit condition of said lamps.

14. A system set forth in claim 13 wherein a capacitor is connected in circuit with each of said serially connected inductive elements and nonlinear resistors and an inductor is connected in series circuit with each of said serially connected capacitors and nonlinear resistors to form thereby oscillatory circuits tuned to the operating frequency of said series resonant inverter so that an oscillatory voltage is provided during the starting condition of said lamps.

15. A ballast circuit for operating at least one gaseous discharge lamp from a high frequency alternating current supply provided by a series resonant inverter, said ballast circuit comprising a filament transformer having a magnetic core, a primary winding and a plurality of filament windings inductively coupled with said primary winding on said core, an inductive element connected in series circuit relationship with said filament transformer to cause a lagging current to flow to said lamp, circuit means connecting said filament windings and said inductive element in circuit with said gaseous discharge lamp, a pair of input terminal leads for connection in circuit with the high frequency alternating current supply, one of said input leads being connected in circuit with said inductive element and the other of said input leads being connected in circuit with said primary winding to apply said high frequency alternating supply across said inductive element and said filament transformer, said filament transformer providing a starting load for the operation of said series resonant inverter.

16. The ballast circuit set forth in claim 15 wherein a capacitor is connected in series circuit relation with said inductive element and said primary winding to form an oscillatory circuit tuned at the operating frequency of the series resonant inverter in order to provide an increased filament voltage during starting.

17. A ballast circuit for operating at least one gaseous discharge lamp from a high frequency alternating current supply provided by a series resonant inverter, said ballast circuit comprising a filament transformer having a magnetic core, a primary winding and a plurality of filament windings inductively coupled therewith on said core, a pair of input terminal leads for connection in circuit with said high frequency alternating current supply, a capacitive element, said capacitive element being connected in series circuit relation with one of said input terminal leads and said primary winding of said filament transformer, the other of said input terminal leads being connected in series circuit with one end of the primary winding and circuit means for connecting said filament windings, said input terminal leads and said capacitor in circuit with the gaseous discharge lamp so that a leading current flows thereto, said filament transformer providing a starting load for the operation of said series resonant inverter.

18. The ballast circuit set forth in claim 17 wherein an inductor is connected in series circuit relation with said capacitor and said primary winding to form an oscillatory circuit tuned at the operating frequency of the series resonant inverter in order to provide an increased filament voltage during starting.

19. A ballast circuit for operating at least one gaseous discharge lamp from a high frequency alternating current supply provided by a series resonant inverter, said ballast circuit comprising a serially connected inductive element and a nonlinear resistor, a pair of input terminal leads for connection with said high frequency alternating supply and connected in circuit with said serially connected inductive element and nonlinear resistor to apply the voltage of said high frequency alternating supply thereacross, and a pair of output leads for connection to said gaseous discharge lamp, said output leads being connected across said nonlinear resistor, and said nonlinear resistor providing a starting load for the operation of said series resonant inverter.

20. The circuit set forth in claim 19 wherein a capacitor is connected in series circuit relationship with said nonlinear resistor and said inductive element so that said inductive element and said capacitor form an oscillatory circuit tuned at the operating frequency of said series resonant inverter to provide an increased starting load for the operation of said series resonant inverter during the open circuit condition of said gaseous discharge lamp.

21. A ballast circuit for starting and operating at least one gaseous discharge lamp from a high frequency alternating current supply provided by a series resonant inverter, said ballast circuit comprising a serially connected capacitive element and a nonlinear resistor, a pair of input terminal leads for connection with said high frequency alternating supply and connected in circuit with said serially connected capacitive element and nonlinear resistor to apply the voltage of said high frequency alternating supply thereacross, and a pair of output leads for connection to said gaseous discharge lamp, said output leads being connected across said nonlinear resistor, and said nonlinear resistor providing a starting load for the operation of said series resonant inverter during the open circuit condition of the lamp.

22. The ballast circuit set forth in claim 20 wherein an inductor is connected in series circuit relationship with said serially connected capacitive element and nonlinear inductor to form an oscillatory circuit tuned at the operating frequency of said series resonant inverter to provide an increased starting load for the inverter during the open circuit condition of the lamp resulting from the transient voltage developed by the oscillatory circuit.

References Cited in the file of this patent
UNITED STATES PATENTS

| | | |
|---|---|---|
| 2,588,858 | Lehmann | Mar. 11, 1952 |
| 2,719,937 | Keiffer | Oct. 4, 1955 |
| 2,923,856 | Greene et al. | Feb. 2, 1960 |